US012668417B2

(12) United States Patent
Lombardi, Jr.

(10) Patent No.: US 12,668,417 B2
(45) Date of Patent: Jun. 30, 2026

(54) DEVICE FOR OPENING AND TYING A DOG POOP BAG

(71) Applicant: John James Lombardi, Jr., Fuquay Varina, NC (US)

(72) Inventor: John James Lombardi, Jr., Fuquay Varina, NC (US)

( * ) Notice: Subject to any disclaimer, the term of this patent is extended or adjusted under 35 U.S.C. 154(b) by 24 days.

(21) Appl. No.: 18/886,379

(22) Filed: Sep. 16, 2024

(65) Prior Publication Data

US 2025/0091801 A1 Mar. 20, 2025

Related U.S. Application Data

(60) Provisional application No. 63/582,988, filed on Sep. 15, 2023.

(51) Int. Cl.
*B65F 1/00* (2006.01)

(52) U.S. Cl.
CPC ........ *B65F 1/002* (2013.01); *B65F 2240/136* (2013.01)

(58) Field of Classification Search
CPC ........................... B65F 1/002; B65F 2240/136
USPC .......................................................... 383/127
See application file for complete search history.

(56) References Cited

U.S. PATENT DOCUMENTS 3,476,423 A * 11/1969 Kentfield ............... B65H 69/00 289/17
4,763,388 A * 8/1988 Kemble ............. B65D 33/1616 24/30.5 R
4,979,933 A * 12/1990 Runge ............... B29C 66/81431 493/215
5,314,217 A * 5/1994 Place ..................... A63H 27/10 289/17
5,568,950 A * 10/1996 Herren ................... A63H 27/10 289/17
5,611,578 A * 3/1997 Angelico, Sr. ......... A63H 27/10 289/17
5,882,051 A * 3/1999 Dreger ................... A63H 27/10 289/17
6,325,426 B1 * 12/2001 Boesl ..................... A63H 27/10 289/1.5
6,540,267 B1 * 4/2003 Rohbock .................. D04G 5/00 289/1.2
6,902,212 B1 * 6/2005 Mize ...................... A63H 27/10 289/17
7,419,195 B1 * 9/2008 Jochum .................. A01K 91/04 289/17
7,967,344 B2 * 6/2011 Herren ................... A63H 27/10 289/17

(Continued)

*Primary Examiner* — Peter N Helvey
(74) *Attorney, Agent, or Firm* — Dunlap Bennett & Ludwig PLLC

(57) ABSTRACT

A one-handed method for opening and tying a dog poop bag that embodies a device that can be held between two fingers. The device has a planar base plate having a first surface and a second surface opposite the first surface. Three prongs extend from the first surface, wherein the three prongs define a triangular arrangement along the first surface. A notch radially extending from a periphery of the base plate wherein a void defined by the notch occupies at least eighty percent of an area defined by triangular arrangement. A handle post extends from the second surface, wherein the handle post can be held between two fingers of a user.

7 Claims, 4 Drawing Sheets

(56) References Cited

U.S. PATENT DOCUMENTS

| | | | | |
|---|---|---|---|---|
| 8,292,335 | B1 * | 10/2012 | Hemingway | A63H 27/10 289/17 |
| D715,373 | S * | 10/2014 | Thompson | D21/453 |
| 9,833,721 | B2 * | 12/2017 | Plouffe | A63H 27/10 |
| 10,974,158 | B1 * | 4/2021 | Herren | A63H 27/10 |
| 11,602,197 | B2 * | 3/2023 | Mak | B65H 69/04 |
| 11,684,864 | B1 * | 6/2023 | O'Dell | B65H 69/04 289/17 |
| 2010/0038906 | A1 * | 2/2010 | Herren | A63H 27/10 289/17 |
| 2016/0059141 | A1 * | 3/2016 | Plouffe | A63H 27/10 289/1.5 |
| 2019/0183094 | A1 * | 6/2019 | Arnett | A01K 27/005 |

* cited by examiner

DEVICE FOR OPENING AND TYING A DOG POOP BAG

CROSS-REFERENCE TO RELATED APPLICATION

This application claims the benefit of priority of U.S. provisional application No. 63/582,988, 15 Sep. 2023, the contents of which are herein incorporated by reference.

BACKGROUND OF THE INVENTION

The present invention relates to pet accessories and, more particularly, a one-handed method for opening and tying a dog poop bag.

Dog owners pick up their dog's poop multiple times a day. When doing so, the owner partakes in a process involving opening the poop bag, bending over, picking up the dog's waste, and tying off the loaded bag. During the portions of the process that involves opening and tying off the poop bag, the owner must use two hands and thus may lose control of their pet by not having a firm grip on the leash.

Current systems of using two hands to open and tie a dog poop bag are inconsistent with one's ability to maintain control of their dog's leash quickly and safely. Using both hands to open and tie the poop bag distracts the owner and so is not a reliable or consistent way to keep their dog and themselves safe.

Specifically, picking up dog poop is cumbersome and awkward for the owner, requiring them to use two hands to open and tie the poop bag. Combined with the fact that a poop bag tends to stick together while a user attempts to open the poop bag increases the difficulty. And tying the bag requires both hands leaving the leash dangling unsecure on the owner's forearm. The distraction and lack of a firm grip on the leash can result in the dog running away and causing injury to themselves, the owner, or another dog or person.

In sum, dog owners currently use both hands to open and tie dog poop bags which lessens their ability to control the dog. The process is lengthy, cumbersome, and awkward for the owner and is unreliable in keeping the dog and owner safe from injury.

As can be seen, there is a need for a one-handed method for opening and tying a dog poop bag that embodies a device that can be held between two fingers.

SUMMARY OF THE INVENTION

The one-handed method for opening and tying a dog poop bag embodies a device enabling a user to with one hand to open and tie a poop bag with one hand so that they can maintain control of their dog with the other hand.

The present invention allows one to use a single hand to open and tie a dog poop bag and still decreases the time it takes to open and tie the bag compared to two-handed method of the conventional approaches. As a result, the present invention allows the user to maintain control of their dog with a firm grip on the dog leash and lessen the distraction and time it takes to open and tie a doggy poop bag.

In one aspect of the present invention, a device to facilitate one-hand opening and tying of a bag includes the following: a planar base plate having a first surface and a second surface opposite the first surface; three prongs extend from the first surface, wherein the three prongs define a triangular arrangement along the first surface; a notch radially extending from a first edge of a periphery of the base plate, wherein the notch occupies at least eighty percent of an area defined by triangular arrangement; and a handle post extending from the second surface, wherein the handle post connects to a handle portion, the handle portion having a circumference greater than a circumference of the handle post.

In another aspect of the present invention, wherein the foregoing device further includes an intermediate post interconnecting the handle post and the handle portion, wherein the intermediate post is conical, tapering outward as it extends to the handle portion, wherein the triangular arrangement defines an isosceles triangle, wherein a boundary of the notch is adjacent to each of the three prongs, wherein the handle post is adjacent a second edge of the periphery of the base plate so that the handle post is diametrically disposed relative to the notch, and wherein the device is dimensioned and adapted so that the handle post slides between the middle and pointer fingers of a human hand so that the notch is not obscured by the index finger while the second edge does not project beyond the middle finger in a direction toward the ring finger.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring now to FIGS. 1 through 8, the present invention embodies a device 100 for single-handedly opening and tying a dog poop bag. The device 100 has a base plate 10. The base plate 10 may be a circular or oval-shaped planar object, approximately 2.25 inches in length and approximately one-and-a-half inch in width. It being understood that the base plate 10 may be other geometric and non-geometric shapes and may have lengths and widths having non-zero values as long as the base plate 10 can lay across and be braced by two fingers, while not being overlapping a third finger, as illustrated in FIGS. 4-8.

Figure 1:
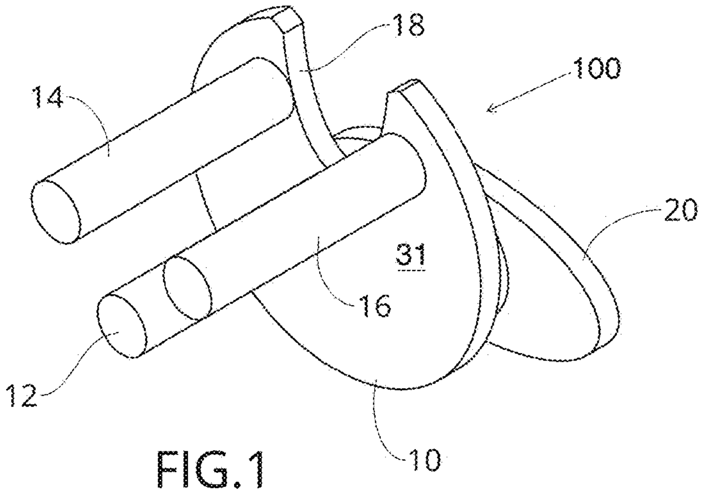
FIG. 1 is a top front perspective view of an exemplary embodiment of the present invention.
Figure 2:
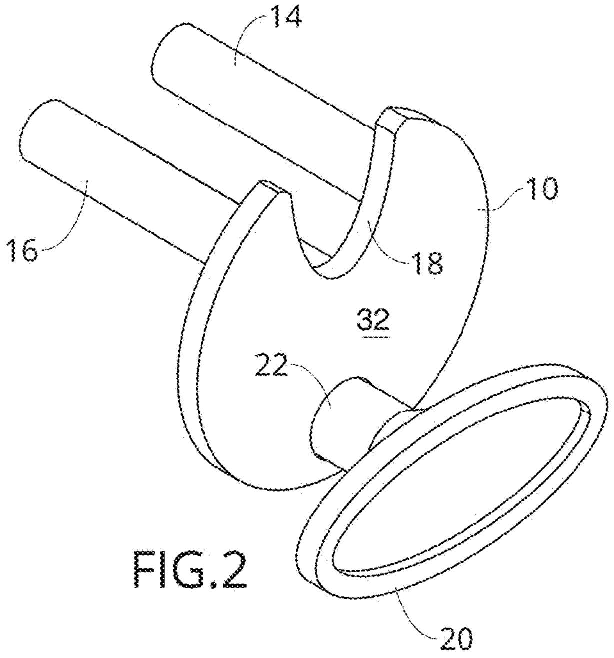
FIG. 2 is a top rear perspective view of an exemplary embodiment of the present invention.
Figure 3:
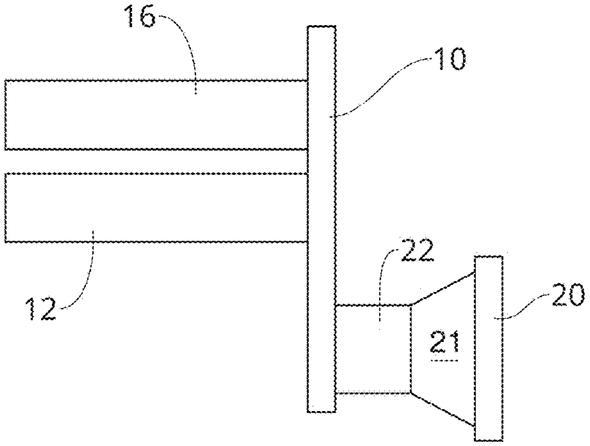
FIG. 3 is a right-side elevation view of an exemplary embodiment of the present invention.
Figure 4:
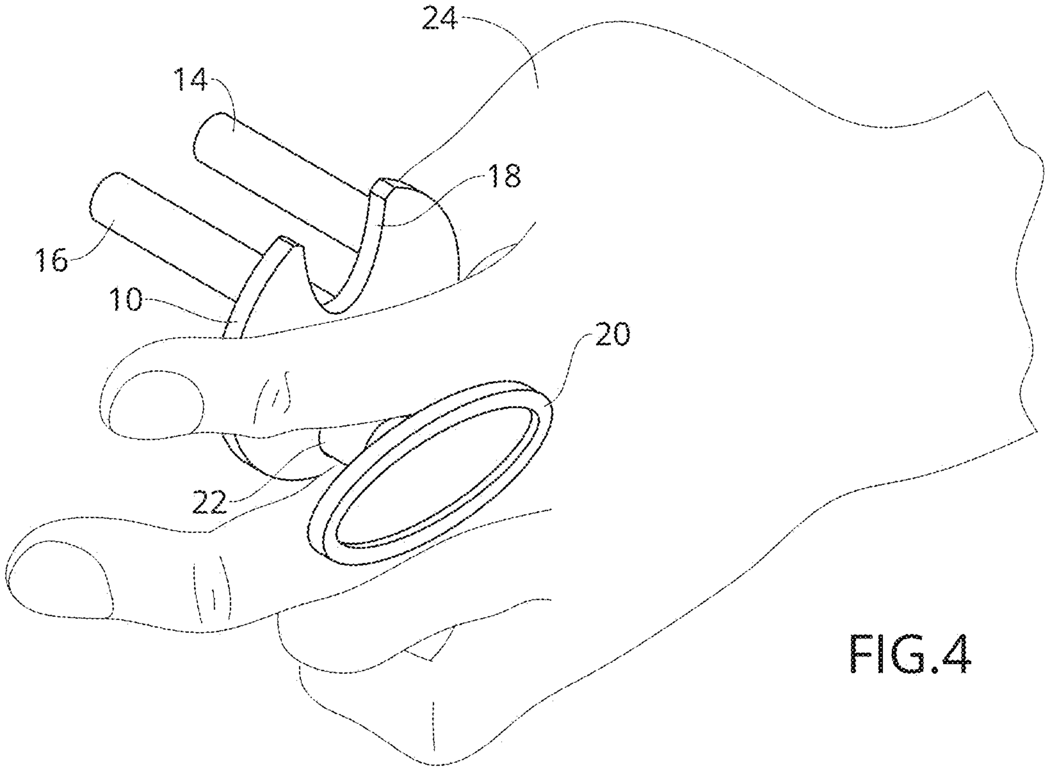
FIG. 4 is a top rear perspective view of an exemplary embodiment of the present invention, shown in use.
Figure 5:
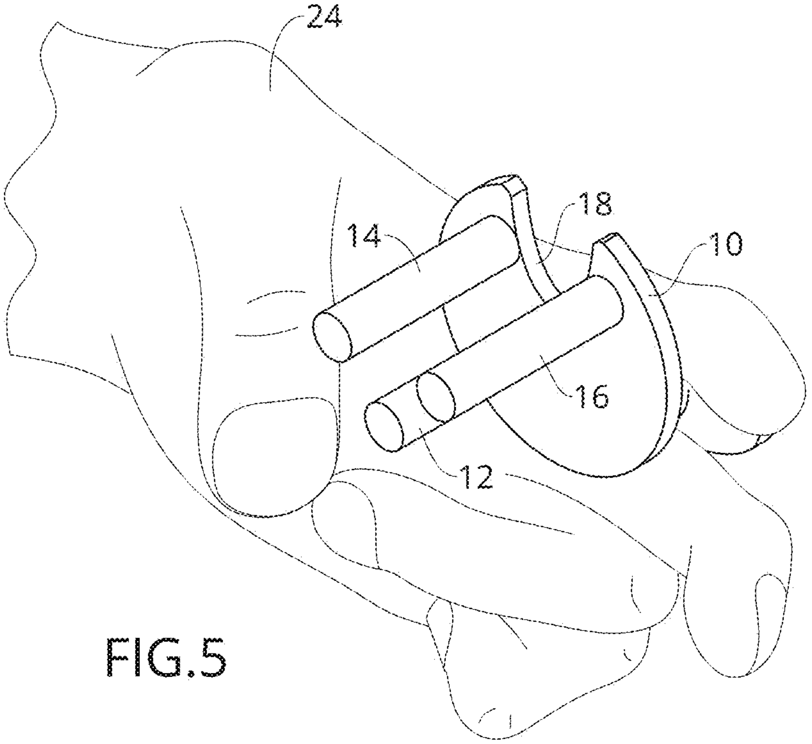
FIG. 5 is a top front perspective view of an exemplary embodiment of the present invention, shown in use.

The base plate 10 is planar and so has two opposing generally flat surfaces: first surface 31 and second surface 32 as denoted on FIGS. 1 and 2. From the first surface 31 three prongs—a first prong 12, a second prong 14, and a third prong 16—perpendicularly extend at least three-quarters of an inch. The prongs 12, 14, 16 may be cylindrical. In one embodiment, the three prongs 12, 14, 16 are each approximately 1.5 inches in length with an approximately 0.25-inch diameter.

The footprints of the prongs 12, 14, 16 along the first surface 31 may define a triangular arrangement. The triangular arrangement may define an isosceles triangle, and in one embodiment an equilateral triangle. The first prong 12 may be generally centrally disposed along the base plate 10, i.e. a first radial distance from a periphery of the base plate 10. The second and third prongs 14 and 16 are disposed adjacent a periphery of the base plate 10. A second radial distance from the periphery of the base plate 10 to the second prong 14 may be equal to a third radial distance from the periphery of the base plate 10 to the third prong 16. The first radial distance is at least twice that of either the second or third radial distances.

A handle post 22 may extend, generally orthogonally, from the second surface 32. The handle post 22 may be generally cylindrical and then transition to an intermediate post 21 that is conical, tapering outward as it extends to and terminates at a handle portion 20 that may be a planar oval-shaped plate. The handle portion 20 is dimensioned and shaped so that the handle and intermediate post 22 and 21 may slide between two fingers of a user 24, like riding along a track, while the handle portion 20, having a greater circumference than the intermediate portion 21 acts as a 'stop' so that said two fingers can maintainer their track-like function. Critically, the handle post 22 may extend from a diametrically opposing side of the base plate 10 that the three prongs 12, 14, and 16.

Figure 6:
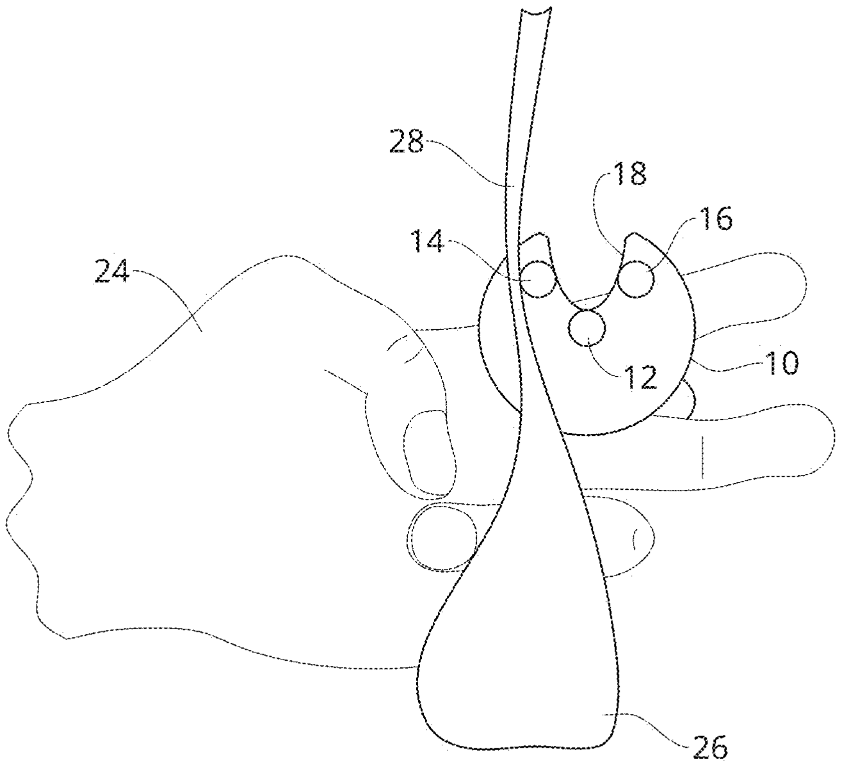
FIG. 6 is a front elevation view of an exemplary embodiment of the present invention, shown in use during a first step of tying a bag.
Figure 7:
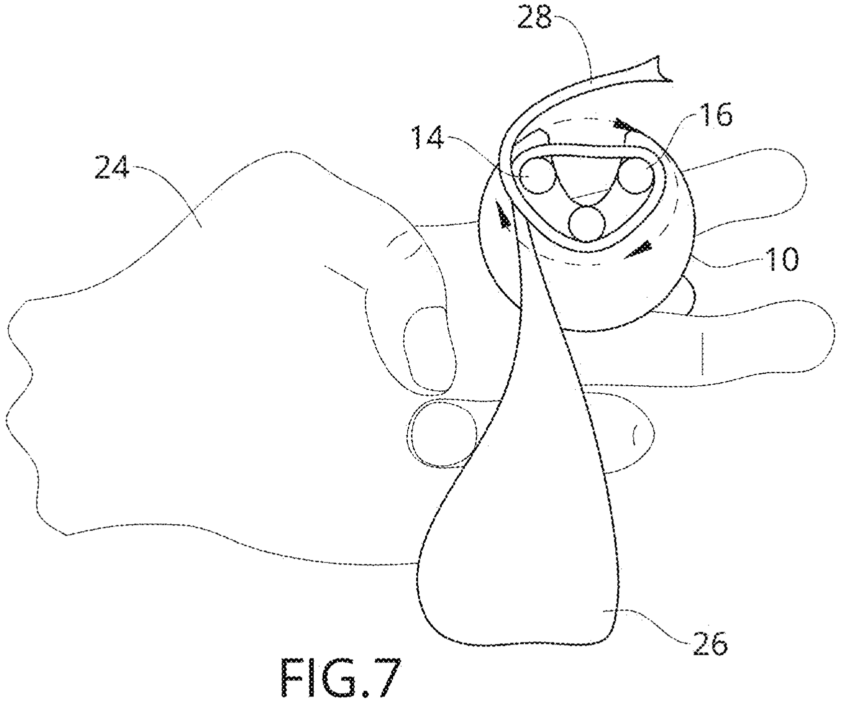
FIG. 7 is a front elevation view of an exemplary embodiment of the present invention, shown in use during a second step of tying the bag.

A notch 18 may be present in the base plate 10, extending radially from the periphery to the center of the base plate 10, wherein the notch 18 is generally U-shaped and terminates adjacent to the first prong 12. The boundary of the notch 18 may also terminate just inward of the second and third prongs 14 and 16, as illustrated in FIGS. 6 and 7. This disposition of the handle post 22 relative to the notch 18 is critical so that the notch 18 is above the index finger during user.

The device 100 may be a unitary construction of three-dimensional (3D) printing, additive manufacture, molding or the like. Various plasticized and/or polymerized materials may be used, such as but not limited to silicone.

The base plate 10 stabilizes the device 100 and aides in opening the elongated dog poop bag 26. During use, the user 24 engages the handle post 22 between their index and middle fingers to secure the device 100. The three prongs 12, 14, and 16 are used to wrap the dog poop bag 26 around, as illustrated in FIG. 7, with the U-shaped notch 18 facilitating the threading the open-end portion 28 of the dog poop bag 26 therethrough to tie the dog poop bag 26 with one hand.

A method of making the present invention may include the following. 3D printed items as described previously may be provided with the dimensions specified. A manufacturer may adhere the 3D-printed base plate 10 to the 3-D printed prongs 12, 14, 16 and post 22, All parts may be necessary for the invention. The dimensions of items could be adjusted to make it more ergonomically comfortable for the user. The base plate 10 could be made into a ring that slips on the finger. The body portion 30 could be a single piece with the three prongs 12, 14, 16 already attached. The dimensions of each component could change to make the device more streamlined.

Figure 8:
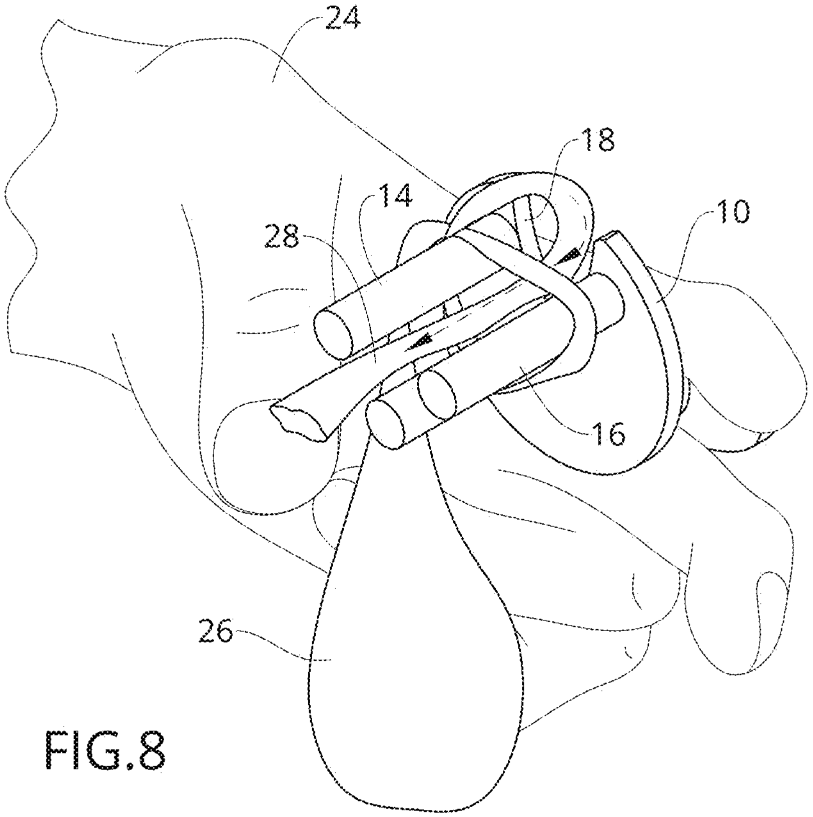
FIG. 8 is a top front perspective view of an exemplary embodiment of the present invention, shown in use during a third step of tying the bag.

Referring to FIGS. 6 through 8, a method of using the present invention may include the following. The device 100 is controlled by the same hand that secures the leash via the handle post 22 being engaged and secured by the user's 24 index and middle fingers of their leash hand. When the user 24 has the dog poop bag 26 in their free (non-leash) hand, they can use any surface of the device 100, for instance the first surface 31 or the handle post 22, which being made of rubber, silicone, or the like grips the dog poop bag 26 to facilitate opening it. When the user must tie a loaded dog poop bag 26, the user 24 holds the open-end portion 28 of the dog poop bag 26, while gravity provides the tenson, and wraps the open-end portion 28 around the three prongs 12, 14, and 16 starting with the one closest to the user 24. Once it's wrapped around all three prongs, the user 24 can slide the open-end portion 28 through the notch 18 from the side associated with the second surface 32, thereby forming a knot with the remainder of that end of the dog poop bag 26, and so when the user 24 pulls the distal end of the open-end portion 28 with their free hand the knot is cinched closed and tied for the rest of the walk.

Also, the present invention can be used to open or tie any plastic bag of similar size to that of a dog poop bag 26.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A device to facilitate one-hand opening and tying of a bag, the device comprising:

a planar base plate having a first surface and a second surface opposite the first surface;

three prongs extend from the first surface, wherein the three prongs define a triangular arrangement along the first surface;

a notch radially extending from a first edge of a periphery of the base plate, wherein the notch occupies at least eighty percent of an area defined by triangular arrangement; and a handle post extending from the second surface, wherein the handle post connects to a handle portion, the handle portion having a circumference greater than a circumference of the handle post.

2. The device of claim 1, further comprising an intermediate post interconnecting the handle post and the handle portion, wherein the intermediate post is conical, tapering outward as it extends to the handle portion.

3. The device of claim 1, wherein the triangular arrangement defines an isosceles triangle.

4. The device of claim 1, wherein the triangular arrangement defines an equilateral triangle.

5. The device of claim 3, wherein a boundary of the notch is adjacent to each of the three prongs.

6. The device of claim 5, wherein the handle post is adjacent a second edge of the periphery of the base plate so that the handle post is diametrically disposed relative to the notch.

7. The device of claim 6, wherein the device is dimensioned and adapted so that the handle post slides between the middle and pointer fingers of a human hand so that the notch is not obscured by the index finger while the second edge does not project beyond the middle finger in a direction toward the ring finger.

* * * * *